United States Patent [19]

Shanahan et al.

[11] Patent Number: 5,710,370
[45] Date of Patent: Jan. 20, 1998

[54] METHOD FOR CALIBRATING A DIFFERENTIAL PRESSURE FLUID FLOW MEASURING SYSTEM

[75] Inventors: Eugene Miles Shanahan, Niwot; John Everett Garnett, Boulder; Robert James Gray, Louisville; Gabriel Dragnea, Longmont, all of Colo.

[73] Assignee: Dieterich Technology Holding Corp., Boulder, Colo.

[21] Appl. No.: 650,140
[22] Filed: May 17, 1996
[51] Int. Cl.[6] .................................................. G01F 25/00
[52] U.S. Cl. .................................................. 73/1.35
[58] Field of Search .................. 73/3, 1.35; 364/571.05

[56] References Cited

U.S. PATENT DOCUMENTS

| | | |
|---|---|---|
| 2,869,367 | 1/1959 | Moore . |
| 4,836,019 | 6/1989 | Hagen et al. . |
| 5,111,827 | 5/1992 | Rantala . |
| 5,479,812 | 1/1996 | Juntunen et al. ................ 73/3 |
| 5,548,990 | 8/1996 | Northedge ...................... 73/3 |

OTHER PUBLICATIONS

Dieterich Standard Annubar Flow Measurement Systems brochure, pp. 2, 3 and 9.
Dieterich Standard Diamond II Annubar Flow sensors catalog, p. 3.

*Primary Examiner*—Robert Raevis
*Attorney, Agent, or Firm*—Richard W. Hanes

[57] ABSTRACT

In a flow measurement system comprising a primary flow sensor and a secondary electronic conversion apparatus for converting high and low fluid pressure signals from the primary flow sensor to an electronic signal output representative of fluid flow, a process for calibrating the system as an integral unit, comprising the steps of applying a plurality of known reference fluid flow rates to the primary flow sensor over the system's operative range of flow conditions, sensing the electrical output of the secondary electronic conversion apparatus for each of the said plurality of reference fluid flow rates, establishing a correction factor for each of said recorded values of electrical output which will tend to linearize the relationship between fluid flow rate and the electrical output of the measuring system, and storing the correction factors in non-volatile memory in a microprocessor which is part of the secondary electronic conversion apparatus.

15 Claims, 6 Drawing Sheets

| DP<br>(IN H2O) | DP<br>(% URL) | XMTR<br>CALIB. DP<br>(% URL) |
|---|---|---|
| 0 | 0.00 | 0.060 |
| 3 | 10.00 | 9.980 |
| 6 | 20.00 | 20.010 |
| 9 | 30.00 | 30.030 |
| 12 | 40.00 | 40.090 |
| 15 | 50.00 | 50.090 |
| 18 | 60.00 | 60.060 |
| 21 | 70.00 | 70.080 |
| 24 | 80.00 | 80.020 |
| 27 | 90.00 | 89.990 |
| 30 | 100.00 | 99.920 |

METHOD FOR CALIBRATING A DIFFERENTIAL PRESSURE FLUID FLOW MEASURING SYSTEM

The present invention relates to differential pressure based fluid flow measurement, including rate, volume and mass, and more specifically to a method for improving the accuracy of measurement by calibrating the system as a whole, over its operating range, with known fluid flow references.

BACKGROUND OF THE INVENTION

Differential pressure based fluid flow meters, or measurement systems, for fluid filling a confined channel, such as a pipe, typically include two basic elements. A system comprises a fluid immersed sensor, as the primary element of the system, and a secondary element comprising mechanical and electronic means to convert the sensed fluid dynamics into a format usable for obtaining needed information, such as rate of flow, volume of flow and mass of flowing fluid.

Primary sensors which detect differential fluid pressure in the flow include such specific types as averaging pitot tubes, orifice plates, flow nozzles and venturi meters.

The secondary portion of the system may include a differential pressure (DP) transducer, a static pressure transducer, a fluid temperature transducer and a flow computer. The raw electrical output of these transducers is typically processed into a signal which is transmitted for subsequent electronic processing in additional apparatus, such as a flow computer. The combination of the transducer and the subsequent electronic means, such as A/D converters, amplifiers, and a central processing unit is often referred to in the trade as a DP transmitter and that term will also be used in this specification. Often the primary sensor and the secondary, or DP transmitter, are physically widely separated and are commonly treated as separate instrumentation entities, meaning that the two elements are calibrated separately and present their own individual accuracy standards.

Preliminary to an understanding of the current state of the art of fluid flow measurement, and the accuracy attainable with available systems, vis-à-vis the present invention, it is useful to review the alternative methods of rating the accuracy of measurement devices.

There are two methods of expressing accuracy. The first is usually expressed as "percent of reading" or "percent of value." This method identifies the error at a specific reading. In measurement devices the use of this method implies that the device produces an error statement based on its readings over the entire operating range. The second method is expressed as the "percent of full scale" (percent of fs) accuracy standard. This method relates the error in a device when it is measuring a quantity that represents 100% of the output. The equivalent "percent of value" error figure for a device calibrated with a "percent of full scale" accuracy statement is calculated using the following equation:

$$\% \text{ Reading Error} = \frac{\% FullScaleError}{\% ofScale} \times 100 \quad \text{Equation \#1}$$

Figure 1:
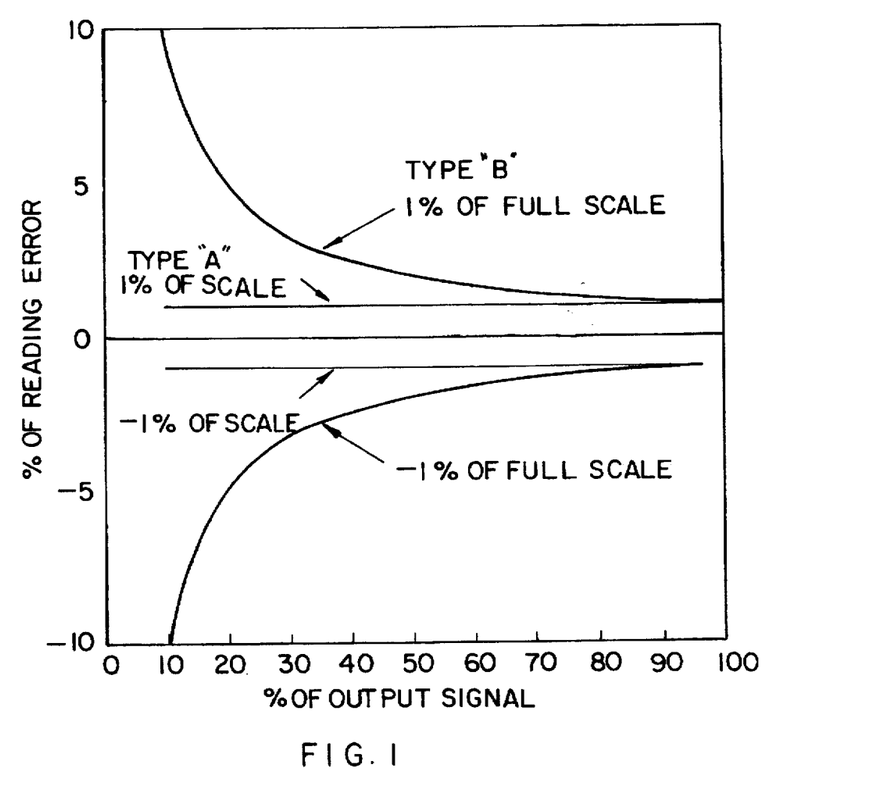
FIG. 1 is a graph showing the relationship between "percent of reading" and "percent of full scale" systems of defining measurement accuracy.

The differences between these two accuracy ranking methods are not obvious until they are plotted. FIG. 1 shows the results of each of the two methods for expressing measurement error. Curve "A" shows a 1% of reading error while curve "B" shows a 1% of full scale error statement. Both are plotted over a 10:1 turndown. In the example shown, a "±1% of full scale" error is equivalent to a "±5% of value" error at a 20% of full range level (5:1 turndown). Flow turndown is the ratio of the highest flow rate expected to be measured by the system to the lowest flow rate expected to be measured, at some stated accuracy. This quantity is typically expressed on one line with a colon, such as 10:1 for a turndown ratio of 10. Most flow measurement devices have a minimum flow and a maximum flow that can be measured within stated accuracy limits. A typical flow rate falls between these values.

Figure 3:
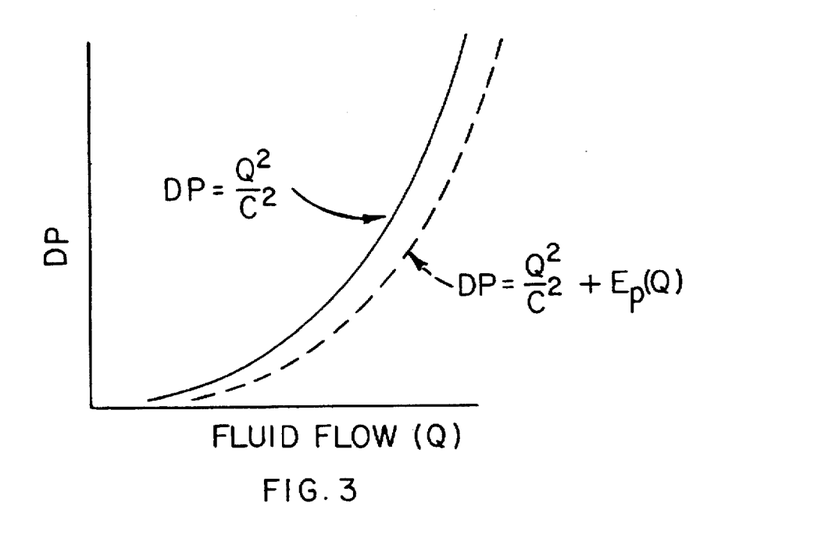
FIG. 3 is a diagrammatic curve illustrating in solid line the mathematically ideal relationship between fluid flow Q and differential pressure DP. The dotted line illustrates the error of primary flow meter measurements.

In differential pressure measurement devices, flow rate Q is derived in accordance with the formula $Q=C\sqrt{DP}$, where C is a constant and DP is the difference between the sensed high and low fluid pressures. Different types of differential pressure sensors have their own benefits and drawbacks, but all of them suffer from an inherent inability to provide fluid pressure outputs which are absolutely related to a fluid flow rate in accordance with the stated mathematical formula over a wide operating range. The induced errors and ultimate performance characteristics of these differential pressure flow sensors are defined by and vary with the installation parameters of each device, such as the shape and dimension of the sensor, location and number of its plenum apertures and the sensor's position inside the fluid carrying pipe. FIG. 3 is a diagrammatic curve illustrating in solid line the mathematically ideal relationship between fluid flow Q and differential pressure DP. The dotted line curve illustrates the same relationship but with the inherent errors of a primary sensing element taken into consideration. An averaging pitot tube type of primary sensor or other DP sensor can be made to exhibit a close similarity to the stated mathematical ideal over a wide flow range, but even those types of sensors cannot offer much better than ±1% of reading over a 10:1 turndown.

Figure 4:
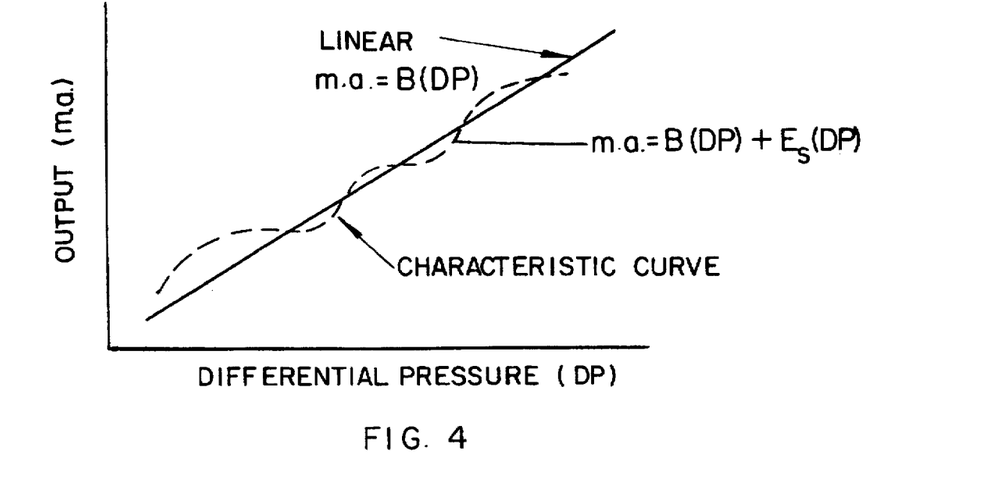
FIG. 4 is a graph illustrative of a typical characteristic curve of the output of a differential pressure transmitter (secondary) as related to differential pressure. The solid line represents a linear relationship between differential pressure and electrical system output. The dashed line is exemplary of an actual curve, taking into consideration the error $E_S$ introduced by non-linearity in the secondary.
Figure 5:
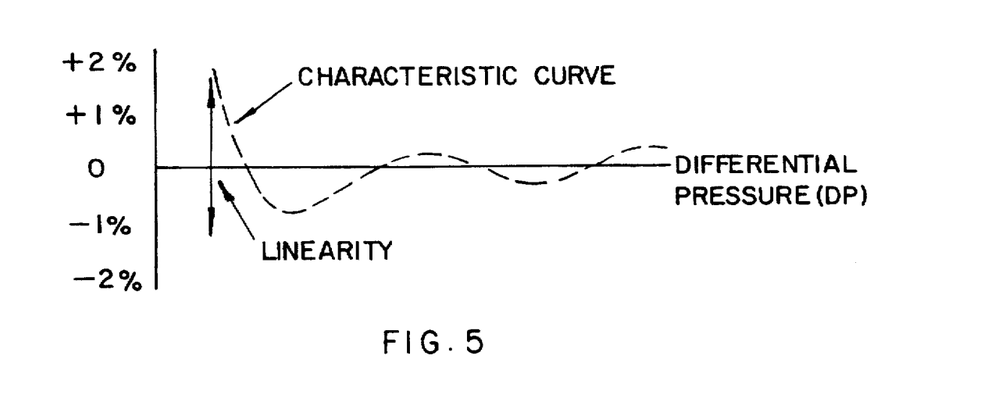
FIG. 5 is a normalized curve showing system output linearity as a percent of reading error deviation from an ideal linear curve which would be represented by the straight horizontal line with zero error.

In addition to the error introduced by the primary, the components of the secondary of a flow measurement system are each responsible for introducing error into the system. Although error is contributed by all of the secondary components, a large portion of it is induced by the non-linearity of the transducers. Linearity, in this context, is the ability of the components to produce, or closely approximate, a linear relationship between the actual physical input and the DP transmitter output. Other components of the secondary also contribute to non-linearity, resulting in secondary error. The solid line curve of FIG. 4 illustrates ideal linearity of the DP transmitter, according to the formula: $m.a.=B \times DP$, where m.a. is the secondary output in milliamperes, B is a constant and DP is the differential fluid pressure. The dotted line curve of FIG. 4 diagrammatically illustrates the non-linear performance of the secondary of the flow meter (without reference to the static pressure or temperature of the fluid) according to the formula: $m.a.=B \times DP+E_S(DP)$ where $E_S$ is the % error in differential pressure due to the secondary. While there may be several different representations of linearity, the term is assumed to represent the independent linearity of the secondary of the flow meter. A straight line is used in FIG. 5 to minimize the maximum deviation of the actual characteristic. The graph of this Figure has been normalized to show linearity as a percent of reading error deviation from the ideal zero error curve, which would be a straight horizontal line. Current flow measurement practice recognizes the non-linearity of the secondary and attempts to compensate for it by "characterizing" the DP transmitter. This is most often done by employing dead weights, or some other form of calibrated DP source, to simulate various pressures on the transducer diaphragm and then modifying the electrical output to correct for the observed discrepancies. In this type of process however, neither actual fluid flow nor the aberrant characteristics of the primary sensor are given consideration in the linearizing attempt.

Accordingly, when independently calibrated primary and secondary elements are combined, the resulting measurement system accuracy must be determined by combining the error of the primary and secondary elements over the selected range of operation in accordance with the "square root of the sum of the squares" rule:

$$\% \text{ System Error} = \sqrt{Ep2 + Es} \qquad \text{Equation \#2}$$

where:

$E_p$=% Error in flow due to the primary; and
$E_S$=% Error in flow due to the secondary, i.e.
$E_S = E_{DP}^2 + E_p^2 + E_T^2$ where:

$E_{DP}$=Error due to the differential pressure transducer,
$E_p$=Error due to the static pressure transducer, and
$E_T$=Error due to the temperature transducer.

The primary element's error contributes directly to the error in flow, whereas the secondary device contributes to error in the differential pressure (DP), which is the square of the error in flow. The percent error in DP will depend upon the percent scale, as shown in FIG. 1. For a DP transmitter or meter, the contribution to the secondary's flow calculation error is:

$$\% \ E_{DP} = \pm \left[ \sqrt{1 + \frac{\% \ Efs}{\% \ DP}} - 1 \right] \times 100 \qquad \text{Equation \#3}$$

where:

%Efs=the % of full scale error (accuracy) of the DP transmitter;
%DP=the % of scale at which the DP transmitter is operating.

$E_p$ and $E_T$ are similarly calculated.

To determine the error in flow at the minimum scale for the desired flow turndown, equation 3 must be substituted into equation 2. To better illustrate the point, reference is made to FIG. 2 where the reading flow system accuracy is plotted as a function of turndown for different types of flow meters. An example of a flow meter with a % of reading accuracy, where there is no secondary element contributing to the system error, is shown in solid lines. The error of an orifice plate or other type of DP sensor working with a DP transmitter is calculated using equations 2 and 3, above, and is plotted in the graph of FIG. 2 with dotted lines. In this exemplary curve the orifice plate sensor itself contributes a ±1% of reading error ($E_p$) and the secondary element has a ±0.1% full scale (fs) error ($E_S$).

Figure 2:
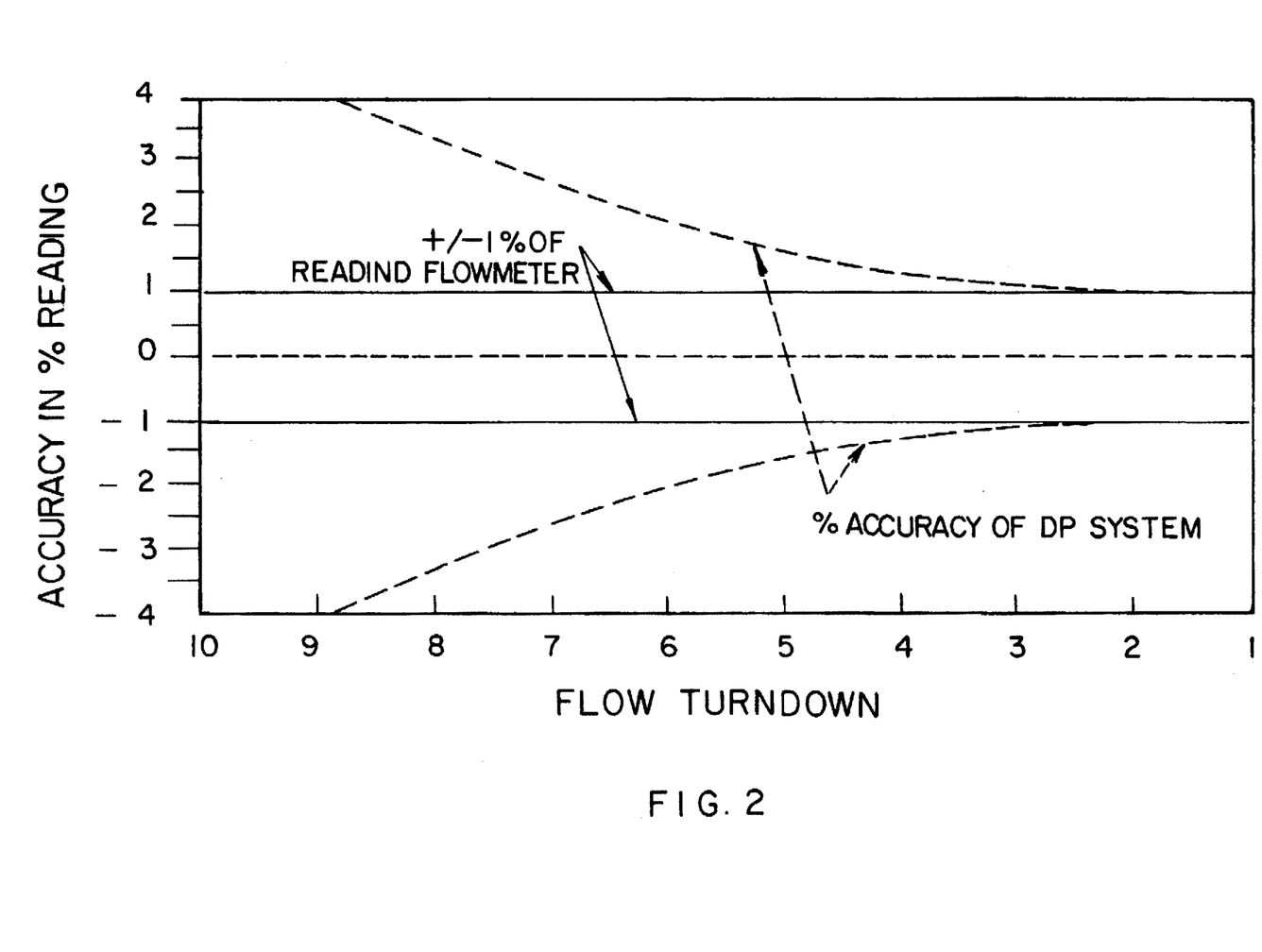
FIG. 2 is a graph showing the percent of the reading flow system accuracy as a function of turndown for two different types of fluid flow meters.

After deriving the dotted line curve of FIG. 2, the problem of the prior art custom of separately calibrating the primary and secondary flow meter elements is apparent. The errors of the separate elements are additive within the flow system, creating a combination where the total error can never be less than the least accurate component of the system.

It is therefore the primary object of the invention to provide a synergistic method of obtaining higher measurement system accuracy by calibrating the assembled combination of primary and secondary system elements with actual reference fluid flow.

A further object of the invention is to provide a method of measurement system calibration that results in unexpectedly better accuracy than that obtained by the square root of the sum of the squares of the individually calibrated system elements.

Another object of the invention is to provide a method for measurement system calibration which results in a wider flow turndown with higher accuracy.

Another object of the invention is provide a process for calibrating a flow measurement system where the flexibility of the secondary element's linearization potential is advantageously employed to correct for errors in the flow primary, as well as to correct for the nonlinearity in the secondary's own components.

Other and still further objects, features and advantages of the invention will become apparent upon a reading of the detailed description of a preferred form of the invention.

The most pertinent known prior art is listed as follows:

Dieterich Standard Annubar® Flow Measurement Systems brochure, where, on pages 2 and 3 (unnumbered), a flow measurement system of the type described in this specification is shown, and on page 9, pressure transmitters and their accuracy are discussed. This measurement system shown does not contemplate the calibration and linearization method of the present invention.

Dieterich Standard Diamond II Annubar® Flow sensors catalog where, on page 3 a diagram of a flow measuring system is shown which is similar to the general system referred to in this specification, but without the linearization method of the present invention, and on page 7 thereof accuracy of the sensor primary is discussed.

U.S. Pat. No. 5,111,827 to Börje Rantala, disclosing, in a respiratory sampling device, a microprocessor to adjust a flow rate in accordance with the composition of a gas, as determined by a gas analyzer.

U.S. Pat. No. 4,836,019 to Floyd W. Hagen, disclosing an air data sensor having a computer programmed to take various compensation tables from calibration curves for various sensors. The computer is programmed to provide an appropriate correction factor to the pressure outputs.

U.S. Pat. No. 2,869,367 to D. W. Moore, describing a system utilizing pressure responsive diaphragms to change electrical resistances in order to linearize the response characteristic of a system.

SUMMARY OF THE INVENTION

The method of the present invention calibrates and characterizes a differential pressure flow measurement system as a unitary assembly, using an actual calibrated flow on the primary sensor. By calibrating the system as a whole, with actual reference fluid flow, instead of relying on the calibration of the primary and secondary elements individually, an unexpected and synergistic effect is produced whereby the system accuracy and turndown is better than that obtained by the square root of the sum of the squares of the individually calibrated system elements.

DETAILED DESCRIPTION

Before addressing the details of the calibration and characterization method of the present invention, a brief description will be made of a flow measurement system in which the calibration method would be used in order to establish the background of the invention.

Figure 6:
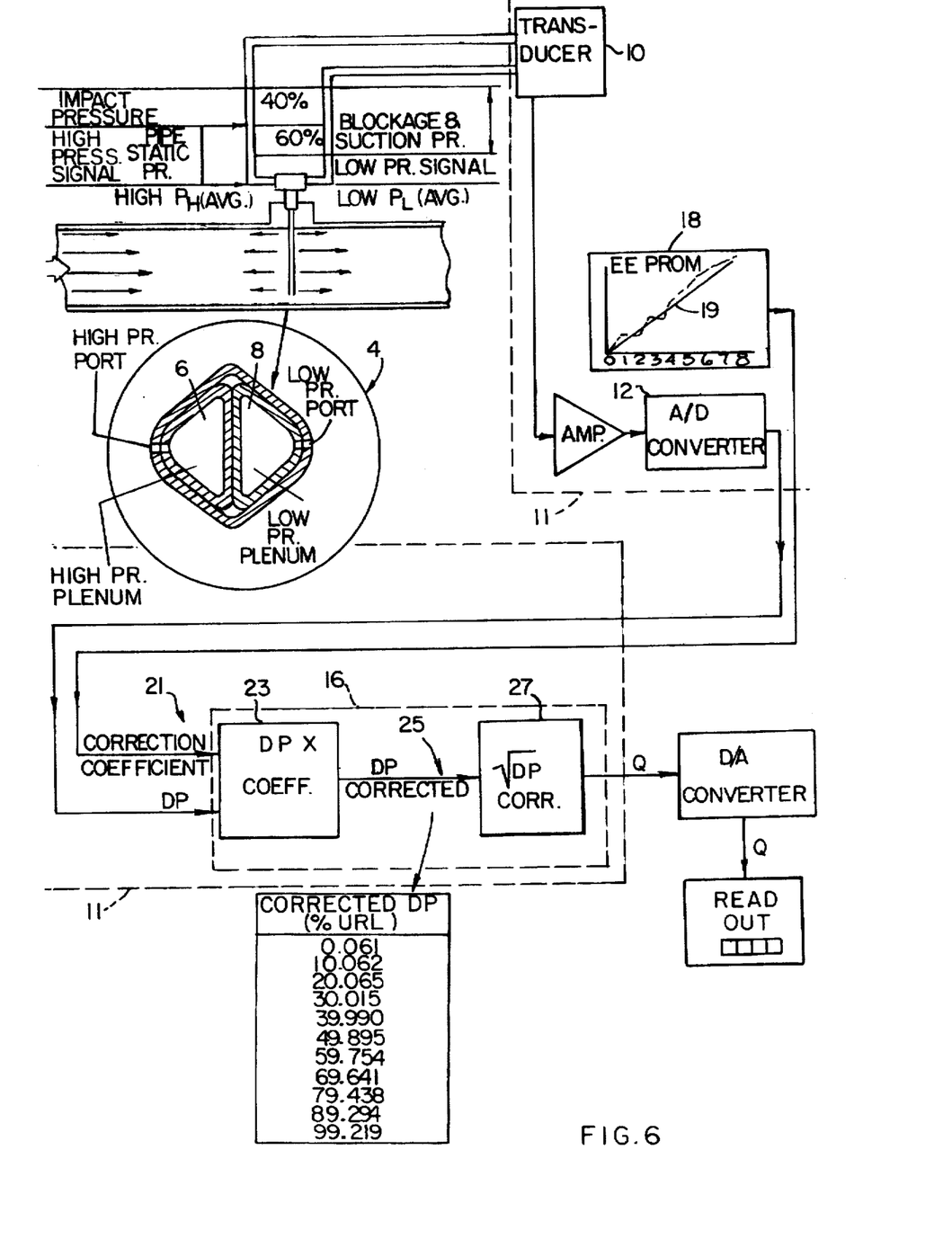
FIG. 6 is a block diagram of a typical DP fluid flow rate measurement system adapted to use the calibration method of the present invention.

FIG. 6 is a block diagram of a typical differential pressure dependent flow measurement system of the type to which the calibration method of the present invention is particularly suited. In this measurement system a pitot tube type of differential pressure flow sensor 4 functions as the primary element, however traditional differential pressure devices such as an orifice plate, venturi tube or flow nozzle can also act as the differential pressure sensing device. The pitot tube shown is of the type described in U.S. Pat. No. 4,154,100 to James B. Harbaugh et al. and U.S. Pat. No. 4,559,836 to Darrel F. Coleman et al., to which patents reference is made for a more complete explanation of the DP flow sensor 4 of FIG. 6.

The upstream facing side of the pitot tube 4 senses the average sensor impact pressure of flowing fluid to establish a high pressure value. The downstream facing side of the pitot tube senses low pressure. The high and low fluid pressures are conducted from the plenums 6 and 8 of the flow sensor 4 to a pressure transducer 10, the first stage of the differential pressure transmitter 11. The pressure transducer transforms the respective high and low fluid pressures issuing out of the primary sensor into an electrical signal whose character is a function of the differential pressure (DP), that is the difference between the sensed high and low fluid pressures. A typical transducer would be one equipped with a sensing element comprising a silicon diaphragm, into the surfaces of which are diffused piezo resistors which comprise an electrical bridge whose output is analogous to the differential pressure applied to the transducer. Other types of DP transmitters may be used, such as capacitance or variable reluctance. The electrical analog signal from the pressure transducer 10 is transformed in the A/D converter 12 to a digital signal for input into a central processing unit (CPU) 16. The CPU 16 performs the square root function as well as other calculations, including the system error corrections required for producing an accurate final output signal of the flow measurement system.

After calibration, in accordance with the method of the present invention, and during operation in actual flow measuring conditions, the electronic signal, representing the fluid differential pressure, addresses stored calibration information in an EEPROM memory 18, which information may be in the form of a look-up table or a polynomial equation 19, to provide collective corrections to the errors in that signal which occur as a result of non-linearity in the transmitter 11 and aberrations in the operation of the primary sensor 4. Obtaining the information to be stored in the EEPROM to implement these corrections is the result of the calibration and characterization process of the present invention and will subsequently be described in detail. The corrected DP signal is further processed by the CPU in the step labeled 27 to determine the square root of the corrected DP. That value is used to determine the flow Q which is then read out in an appropriate instrument 30 or applied to some further process or instrumentation.

Having generally described the function of the flow meter in actual operation, the method of arriving at the calibration coefficients which are stored in the EEPROM will now be described. As mentioned earlier, both the primary sensor and the secondary element contribute error and each adversely effects the accuracy of the system. By providing correction for both of these sources of error at the same time the final flow system signal will have greater accuracy than it would otherwise have by calibrating the primary and secondary elements individually.

With respect to an understanding of the error contributed by the primary sensor, refer again to FIG. 3. As for the secondary, the DP transmitter's non-linear output is initially linearized against a calibrated DP source, such as a dead weight tester. See FIG. 7 for a diagrammatic illustration of an initial linearization process of the DP transmitter by itself. At this point it should be noted that linearization is a form of calibration that is used when the desired output is a linear function of the input of a device. There are situations, however when the desired output is exponential or a polynomial function or some other function of the input. Therefore, to generically define the calibration method of the present invention, which covers all such functions, the terms "characterizing" or "characterization" may be used to broadly include linearization, as well as the others mentioned.

Figure 8:
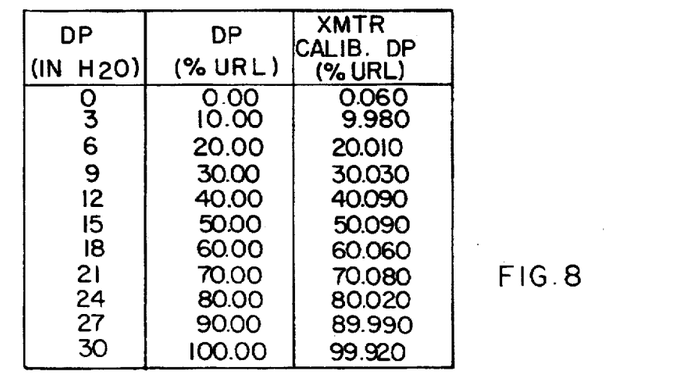
FIG. 8 is an exemplary table showing percentage values for differential pressure taken in ten percent increments over the operating range of a DP transmitter where URL is the Upper Range Limit of the transmitter measured in inches of water column. The table shows corresponding values of the initial transmitter characterization, done as shown in FIG. 7 (Calib. DP) and the Corrected DP ($DP_{corrected}$), shown in FIG. 6.

The initial linearization process characterizes the transmitter's output from the known differential forces supplied by a calibrated DP source. As a result of this initial characterization, the transmitter output will be referred to as $DP_{calibrated}$. As an example of the result of such initial calibration, reference is made to FIG. 8 where $DP_{calibrated}$ is shown for increments of differential pressure values from zero to 100% of the upper range limit (URL) of the transmitter, as supplied by the calibrated DP source. As part of the initial calibration process, these $DP_{cal}$ values are stored in the non-volatile memory of the transmitter's CPU. See FIG. 6 for a showing of the central processing unit.

However, in accordance with the objects of the present invention, it is not enough to linearize the DP transmitter alone. The objects of the invention are accomplished by characterizing the system DP output against the transmitter's $DP_{calibrated}$ output, plus the flow coefficient, K, for the primary sensor, that is: $DP_{cal} + K \rightarrow DP_{corrected}$.

In other words, the initial characterization of the DP transmitter is further enhanced in the context of the total measurement system by taking into consideration in the calibration, the K value variation of the primary sensor. This is accomplished by storing one or more correction coefficients in the EEPROM memory 18 and using those coefficients to characterize the measurement system as an integral whole.

Figure 9:
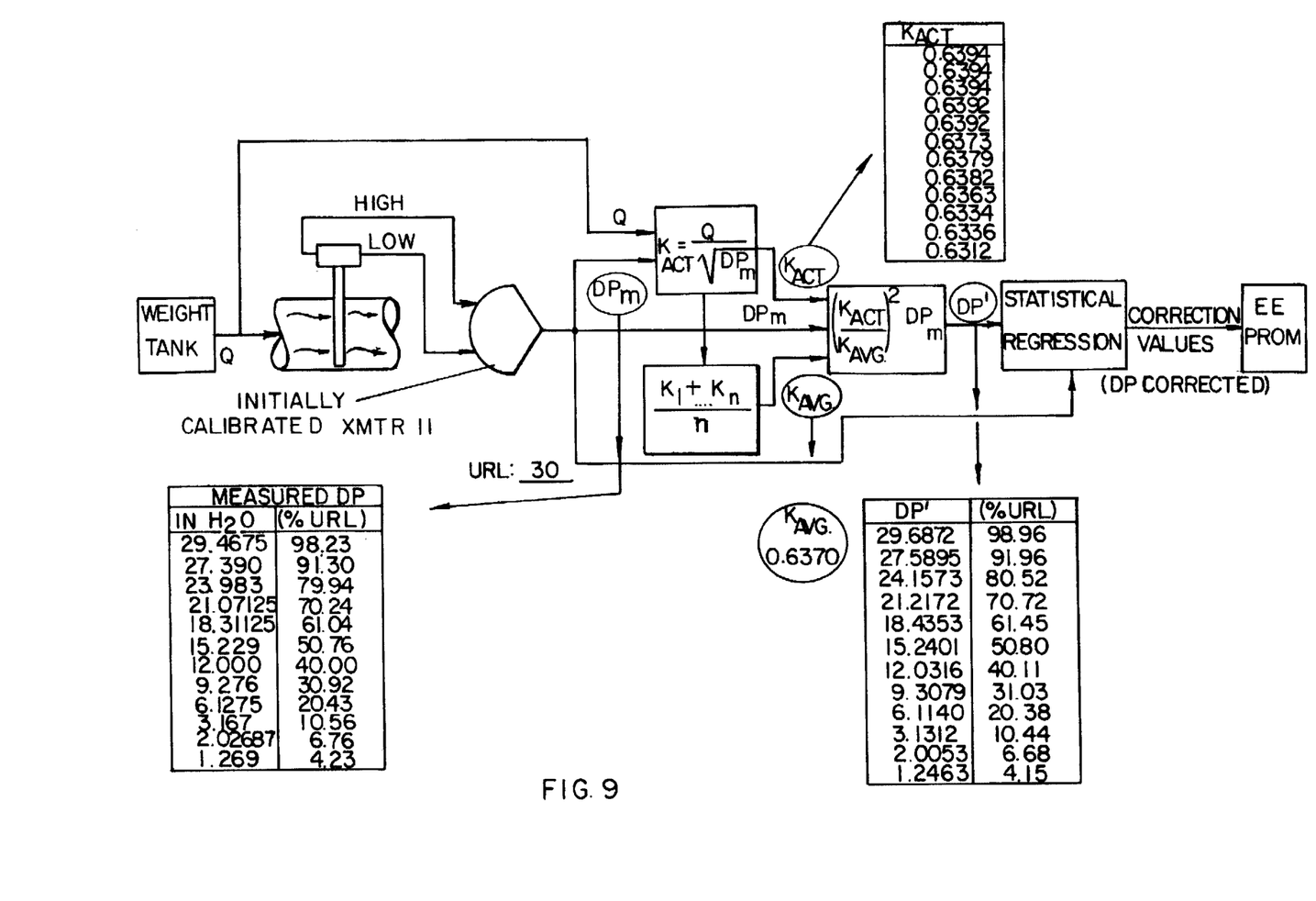
FIG. 9 is a block flow diagram of the calibration method of the present invention, with exemplary tables of values taken from indicated points in the process.

Reference to FIG. 9 will facilitate an understanding of how the correction coefficients 21 which are stored in the EEPROM are derived. The numbers in the tables which are referenced to different portions of the diagram are exemplary only, for the purpose of better understanding the process. First, the K values for a chosen different number of flows are determined. The number of fluid flow values chosen for the calibration process is a judgment call. For purposes of this description, eleven will be chosen, covering the operating range of the system in ten percent increments, starting with zero. Although reference fluid flows may be obtained through a number of different techniques, a preferred form involves the use of a highly accurate laboratory weigh tank, which determines mass flow directly. A number of different chosen reference flows are directed into a pipe having a primary sensor, such as the averaging pitot tube 4 of FIG. 6. The sensed high and low pressures are directed to the already initially calibrated DP transmitter, from which a differential pressure signal $DP_{measured}$ ($DP_M$) is obtained. This signal, along with an input signal Q, representing a calibrated reference fluid flow from the weigh tank calculates the actual value K of the primary sensor, $K_{act}$, according to the formula:

$$K_{act} = \frac{q}{\sqrt{DP_M}}$$

From the $K_{act}$ value for each of the chosen flow rates an average K ($K_{avg}$) is determined by known statistical analysis methods. In the next step, a nominal DP or DP' is determined according to the formula $$\left( \frac{K_{act}}{K_{avg}} \right)^2 \times DP_M = DP'.$$

Following determination of the nominal DP for each of the chosen flow rates, a statistical regression analysis is used to arrive at one or more correction coefficients for the system which are then stored in the EEPROM. Preferably, the regression uses the least squares method to fit a line through a set of points, each point representing a respective nominal DP value for one of the measured DP values. The dependent variable in the analysis is the measured DP ($DP_M$), while the independent variable is the nominal DP, DP'. In accordance with well known techniques the regression analysis can be expanded for increased accuracy by using additional independent variables, $DP'^2$, $DP'^3$, $DP'^5$. The regression analysis yields the X Variables, shown in the table of FIG. 9, with their exemplary coefficient values. These are the coefficients which need to be applied to the initial calibration values stored into the transmitter's EEPROM to determine the new calibration values:

$$DP_{cor} = Intercept + X_{var1}(DP_{cal}) + X_{var2}(DP_{cal})^2 + \ldots X_{var5}(DP_{cal})^5$$

where:

$X_{varn}$ is the regression coefficient for the nth independent variable;

intercept is the point where the straight line crosses the Y axis.

Depending on the desired accuracy, 2, 3 or 6 independent variables could be used, instead of the five shown in this example.

When the memory is addressed in actual system operation the final corrected DP value ($DP_{cor}$) is used to determine the correct flow output.

Figure 7:
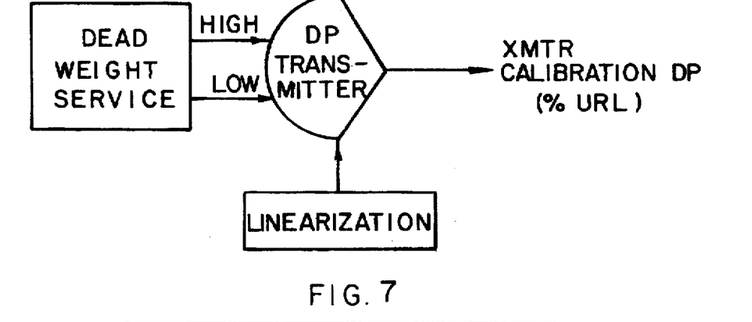
FIG. 7 is a diagrammatic block flow diagram of the initial calibration of the DP transmitter used in a system shown in FIG. 6.
Figure 10:
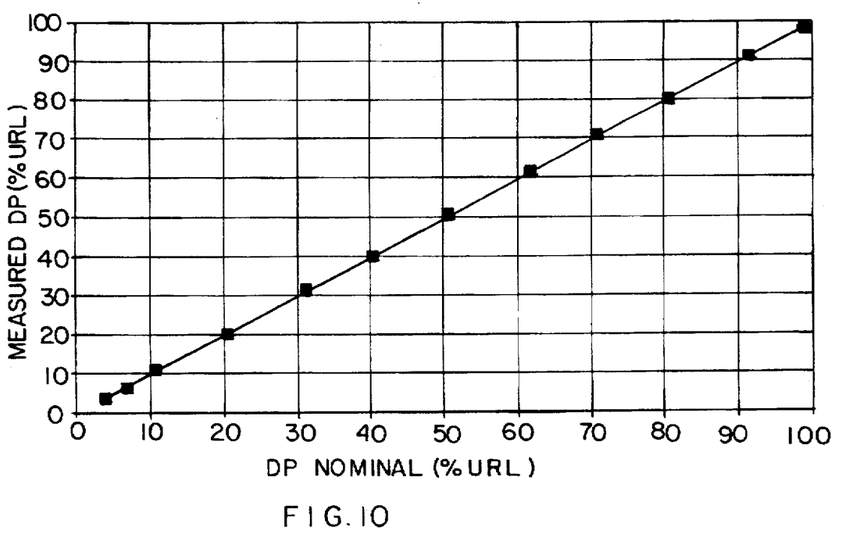
FIG. 10 is a graph showing the relationship between $Dp_{measured}$, as a percentage of the upper range limit (URL) and the normalized DP, or DP', as a percentage of URL.

Calibration is carried out over the full flow range of the measurement system, establishing an accuracy of at least ±0.5% over the full calibrated flow range. The calculated correction values (corrected DP's) replace the corrections in the EEPROM which were established during the initial characterization of the transmitter, as shown in FIG. 7. Characterizing the flow meter with this method of calibration permits the electrical output 27 of the meter to track the true reference flow, thereby compensating for all errors due to non-linearity, and the flow coefficient of the primary system, as shown in FIG. 10.

We claim:

1. A system calibration process for a differential pressure flow measuring system for fluid flowing in a confined conduit, where such system comprises a primary flow sensor and a secondary electro-mechanical conversion apparatus, including electronic memory, for converting high and low fluid pressure signals derived from the primary flow sensor to an electric signal output representative of fluid flow, comprising the steps of;

calibrating the secondary apparatus against known pressures over the operating range of the apparatus to obtain initial output characterization data and storing the characterization data in the electronic memory, sensing the fluid impact pressure and the fluid static low pressure for a plurality of known reference fluid flows to establish a plurality of high and low pressure signals over a range of flows, with the use of the initial output characterization data, transducing the said high and low pressure signals into measured electrical differential pressure signals representative of the difference between the sensed high and low pressure for each of the plurality of reference flow rates, determining a correction factor for the output of the secondary apparatus for each of the plurality of reference flow rates as a function of the deviation of each value of measured differential pressure from the nominal differential pressure corresponding to each of the said plurality of reference flow rates, modifying the data from the initially characterized secondary apparatus by overwriting, in the electronic memory, the initial characterization data with the calculated correction values.

2. The method of claim 1 wherein the step of determining correction factors for the output of the secondary apparatus for each of the plurality of reference flow rates includes the step of determining the nominal differential pressure output of the system by defining the nominal flow coefficient of the primary.

3. The method of claim 2 and further including the step of determining the average actual flow coefficient value for the plurality of reference flows.

4. The method of claim 3 wherein the step of determining correction factors for the output of the secondary apparatus for each of the plurality of reference flow rates includes the step of correcting the measured differential pressure output values for the deviation of the actual flow coefficient from the nominal flow coefficient.

5. The method of claim 4 wherein the step of determining a correction factor for the output of the secondary apparatus for each of the plurality of reference flow rates includes the step of subjecting the values of the measured differential pressure and the determined nominal differential pressure values to a statistical regression analysis to establish the correction factors.

6. For a differential pressure flow measuring system comprising a primary flow sensor and a secondary electro-mechanical conversion apparatus for converting high and low fluid pressure signals from the primary flow sensor to an electronic signal output representative of fluid flow, a system calibration process, comprising the steps of;

applying a plurality of known reference fluid flow rates to the primary flow sensor over the system's operative range of flow conditions,     sensing the electrical output of the secondary electronic conversion apparatus for each of the said plurality of reference fluid flow rates;

establishing a correction factor for each of the plurality of reference flow rates which will tend to characterize a desired relationship between the fluid flow rate and the electrical output of the measuring system, and     storing the correction factors in non-volatile memory.

7. The method of claim 6 and further including the step of initially linearizing the secondary electro-mechanical apparatus against known pressures over the operating range of the apparatus to obtain data for linearizing the output of the said electro-mechanical apparatus.

8. A system calibration process for differential pressure flow measurement in a system having fluid flowing in a confined conduit, and having a primary flow sensor and a secondary electro-mechanical conversion apparatus, including electronic memory, for converting high and low fluid pressure signals derived from the primary flow sensor to an electric signal representative of fluid flow, comprising the steps of;

sensing the fluid impact pressure and the fluid static low pressure for a plurality of known reference fluid flows to establish a plurality of high and low pressure signals over a range of fluid flows,     transducing the said high and low pressure signals into measured electrical differential pressure signals representative of the difference between the sensed high and low pressure for each of the plurality of reference flow rates,     establishing a desired relationship between the reference flow rates and the electrical output of the secondary apparatus for each of the plurality of the reference flow rates,     overwriting into the electronic memory the said established desired relationship of the secondary apparatus.

9. The method of claim 8 and further including the step of initially characterizing the secondary electro-mechanical apparatus against known pressures over the operating range of the apparatus to obtain data for characterizing the output of the said electro-mechanical apparatus.

10. The method of claim 8 where the step of establishing a desired relationship includes that of linearization.

11. For a differential pressure flow measuring system comprising a primary flow sensor and a secondary electro-mechanical conversion apparatus for convening high and low fluid pressure signals from the primary flow sensor to an electronic signal output representative of fluid flow, a system calibration process, comprising the steps of;

applying a plurality of known reference fluid flow rates to the primary flow sensor over the system's operative range of flow conditions,     sensing the electrical output of the secondary electronic conversion apparatus for each of the said plurality of reference fluid flow rates;

establishing a correction factor for each of the plurality of reference flow rates which will tend to linearize the relationship between fluid flow rate and the electrical output of the measuring system as a function of the deviation of each value of measured differential pressure from the nominal differential pressure corresponding to each of the plurality of reference flow rates,     storing the correction factors in non-volatile memory, and     initially linearizing the secondary electro-mechanical apparatus against known pressure over the operating range of the apparatus to obtain data for linearizing the output of the said electro-mechanical apparatus.

12. For a differential pressure flow measuring system comprising a primary flow sensor and a secondary electro-mechanical conversion apparatus for converting high and low fluid pressure signals from the primary flow sensor to an electronic signal output representative of fluid flow, a system calibration process, comprising the steps of;

applying a plurality of known reference fluid flow rates to the primary flow sensor over the system's operative range of flow conditions,     sensing the electrical output of the secondary electronic conversion apparatus for each of the said plurality of reference fluid flow rates;

establishing a correction factor for each of the plurality of reference flow rates which will tend to linearize the relationship between fluid flow rate and the electrical output of the measuring system as a function of the deviation of each value of measured differential pressure from the nominal differential pressure corresponding to each of the plurality of reference flow rates,     storing the correction factors in non-volatile memory,     initially linearizing the secondary electro-mechanical apparatus against known pressure over the operating range of the apparatus to obtain data for linearizing the output of the said electro-mechanical apparatus, and     modifying the initial linearization data for the secondary electro-mechanical apparatus with the determined correction factors.

13. A system calibration process for differential pressure flow measurement in a system having fluid flowing in a confined conduit, and having a primary flow sensor and a secondary electro-mechanical conversion apparatus, including electronic memory, for converting high and low fluid pressure signals derived from the primary flow sensor to an electric signal representative of fluid flow, comprising the steps of;

sensing the fluid impact pressure and the fluid static low pressure for a plurality of known reference fluid flows to establish a plurality of high and low pressure signals over a range of fluid flows,     transducing the said high and low pressure signals into measured electrical differential pressure signals representative of the difference between the sensed high and low pressure for each of the plurality of reference flow rates,     establishing a desired relationship between the reference flow rates and the electrical output of the secondary apparatus for each of the plurality of the reference flow rates at a function of the deviation of each value of measured differential pressure from the nominal differential pressure corresponding to each of the plurality of reference flow rates, overwriting into the electronic memory the said established desired relationship of the secondary apparatus, and initially characterizing the secondary electro-mechanical apparatus against known pressures over the operating range of the apparatus to obtain data for characterizing the output of the said electro-mechanical apparatus.

14. The method of claim 13 and further including the step of modifying the data obtained by initially characterizing the secondary electro-mechanical apparatus with the determined correction factors.

15. The method of claim 14 and further including the step of storing the correction factors in non-volatile memory.

* * * * *

UNITED STATES PATENT AND TRADEMARK OFFICE
CERTIFICATE OF CORRECTION

PATENT NO. : 5,710,370

DATED : January 20, 1998

INVENTOR(S) : Eugene M. Shanahan, et al.

It is certified that error appears in the above-identified patent and that said Letters Patent is hereby corrected as shown below:

Column 7, line 31: The formula is:

Column 8, line 58: Following "primary" insert -- flow sensor --
Column 9, line 64: Delete "convening" and insert -- converting --
Column 11, line 2: Delete "at" and insert -- as --

Signed and Sealed this

Twenty-third Day of June, 1998

*Attest:*

BRUCE LEHMAN

*Attesting Officer*  *Commissioner of Patents and Trademarks*